United States Patent [19]

Saito

[11] Patent Number: 4,897,746
[45] Date of Patent: Jan. 30, 1990

[54] MAGNETIC HEAD DEVICE
[75] Inventor: Shoji Saito, Fuji, Japan
[73] Assignee: Kabushiki Kaisha Toshiba, Kawasaki, Japan
[21] Appl. No.: 137,665
[22] Filed: Dec. 24, 1987
[30] Foreign Application Priority Data Dec. 25, 1986 [JP] Japan .................. 61-307665

[51] Int. Cl.$^4$ ............................. G11B 5/265
[52] U.S. Cl. .................... 360/118; 360/121
[58] Field of Search ........... 360/118, 121, 119, 122, 360/125, 126, 62-64

[56] References Cited

U.S. PATENT DOCUMENTS

| 4,622,601 | 11/1986 | Isozaki et al. | 360/118 |
| 4,803,571 | 2/1989 | Fujioka et al. | 360/121 |
| 4,805,051 | 2/1989 | DeMarco et al. | 360/121 |

OTHER PUBLICATIONS

IBM TDB, "Bidirectional Read-After-Write Tunnel Erase Head", Barrett et al., vol. 16, No. 12, May 1974, p. 3831.

IBM TDB, "Side Erase Magnetic Head", Dawson, vol. 8, No. 2, Jul. 1965, p. 220.

Primary Examiner—John H. Wolff
Assistant Examiner—Matthew J. Bussan
Attorney, Agent, or Firm—Cushman, Darby & Cushman

[57] ABSTRACT

A magnetic head device for a floppy disk drive apparatus, which can read data from, and write data on, floppy disks of different recording densities is disclosed. The magnetic head device comprises a read/write head having at least two read/write gaps, an erase head, and gap selecting circuit. The read/write gaps have different gap length one another. Respective gap lengths correspond to the recording densities of the floppy disks. A gap selecting circuit of the magnetic head device selectes an optimal read/write gap for the floppy disk loaded to the floppy disk drive apparatus. The type, or the recording density, of the floppy disk loaded to the floppy disk drive apparatus is checked by means of a high recording density detecting switch. The detecting switch sends a signal to the gap selecting circuit in accordance with the recording density of the loaded floppy disk.

6 Claims, 5 Drawing Sheets

MAGNETIC HEAD DEVICE

BACKGROUND OF THE INVENTION

The present invention relates to a magnetic head device for use in combination with a floppy disk drive apparatus and, more particularly, to a magnetic head device which can read and write data with different electromagnetic conversion characteristics and can, therefore, read data from, and write data on, floppy disks of different recording densities.

A floppy disk drive apparatus has compatibility with respect to floppy disks of the same size. Recently, a recording density of floppy disks has been highly increased, so that floppy disks with a high recording density and those with a low recording density are both present. Since these floppy disks have compatibility, they can be used in a single floppy disk drive apparatus. In this case, data is written on or read from the floppy disks by a magnetic head device having a single read/write gap.

A magnetic head device of a floppy disk drive apparatus can be roughly classified into a tunnel erase head and a straddle head in accordance with the head structure. A magnetic head device of the tunnel erase head type can be further classified into a laminate type and a bulk type. Conventional magnetic head devices include a core having a single read/write gap regardless of the type, and a gap length of the read/write gap is constant. Therefore, data is written on or read from various floppy disks with different recording densities by the single read/write gap having the constant gap length. However, an optimal gap length exists in accordance with each of different recording densities of disks. In general, as a recording density of a floppy disk is increased, an optimal gap length for the density is reduced. Conventional magnetic head device have only a single read/write gap, and a gap length of the read/write gap is set optimal for a floppy disk with either a high or low density or for a floppy disk with a representative recording density between the high and low densities. For example, when a gap length of a read/write gap is set optimal for a disk with a low recording density, the magnetic head device reads data from or writes data on a disk by the use of this read/write gap for a disk with a high recording density, so that the magnetic head device cannot read and write data with optimal conversion characteristics for the disk with a high recording density. Especially as recording density of floppy disks is increased, a difference between a gap length optimal for a floppy disk loaded in the apparatus and a gap length set in the magnetic head device is increased. For this reason, in a conventional magnetic head device, as the difference between the two gap lengths is increased, resolution and electromagnetic conversion characteristics in a read/write operation are degraded. Therefore, it is difficult to perform an optimal read/write operation.

SUMMARY OF THE INVENTION

It is, therefore, an object of the present invention to provide a magnetic head device for a floppy disk drive apparatus which can read data from and write data on floppy disks of different recording densities with optimal electromagnetic conversion characteristics.

In order to achieve the above object, according to the present invention, there is provided a magnetic head device for a floppy disk drive apparatus which can read data from, and write data on floppy disks of different recording densities and has a main axis extending in a tangential direction to rotation of the disk, the magnetic head device comprising a read/write head arranged along the main axis of the magnetic head device and having at least two read/write gaps, the read/write gaps being arranged at intervals substantially in the direction of the main axis and having different gap lengths corresponding to recording densities of the floppy disks, respectively, an erase head having an erase gap.

BRIEF DESCRIPTION OF THE DRAWINGS

FIGS. 1 to 3 show a magnetic head device for use in combination with a floppy disk apparatus according to an embodiment of he present invention, in which FIG. 1 is a front view, FIG. 2 is a side view, and FIG. 3 is a schematic bottom view;

FIGS. 4 and 5 show a magnetic head device according to a second embodiment of the present invention, in which FIG. 4 is a perspective view, and FIG. 5 is an exploded view;

DETAILED DESCRIPTION OF THE PREFERRED EMBODIMENTS

Preferred embodiments of the present invention will be described in detail below with reference to the accompanying drawings.

Figure 1:
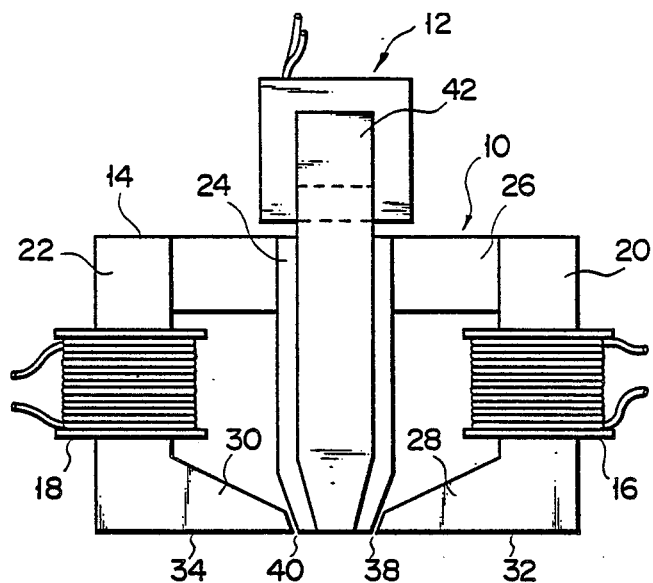
Figure 2:
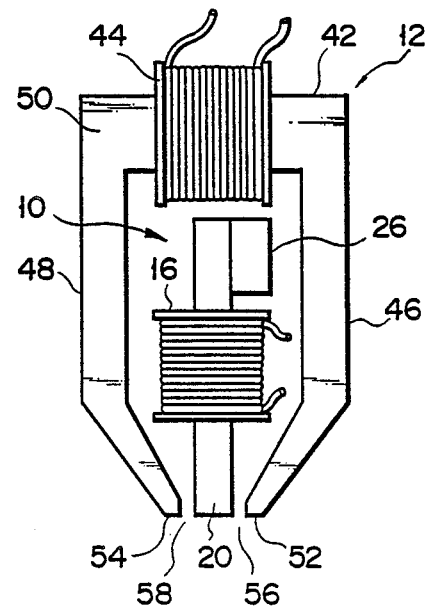
Figure 3:
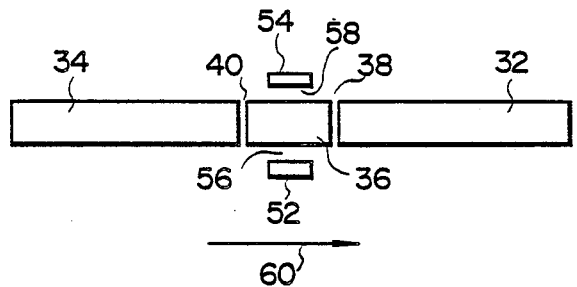

FIGS. 1 to 3 show a straddle erase head type magnetic head device according to a first embodiment of the present invention. As is apparent from FIGS. 1 and 2, this magnetic head device includes read/write head 10 and erase head 12. Read/write head 10 consists of read/write core 14 and read/write coils 16 and 18. Core 14 includes four core blocks 20, 22, 24, and 26 and is substantially E-shaped as a whole. Blocks 20, 22, 24, and 26 are made of a magnetic material such as ferrite. Blocks 20, 22, and 24 having substantially square pillar shape are arranged parallel to and spaced apart from each other by predetermined distances. Block 24 is located between blocks 20 and 22. Blocks 20, 22, and 24 are coupled with each other by block 26 arranged in a direction perpendicular to blocks 20, 22, and 24. Block 26 also has a substantially square pillar shape and is connected to upper end portions at the same sides of blocks 20, 22, and 24, respectively. Blocks 20, 22, and 24 have substantially the same lengths, and block 26 has a length corresponding to a distance between blocks 20 and 22. Block 20 has tapered face formation portion 28. Face formation portion 28 extends from the lower end portion of block 20 to block 24. Similarly, block 22 has tapered face formation portion 30. Lower end faces of face formation portions 28 and 30, respectively, of block 20 and 22 are arranged in the same plane as that of a lower end face of block 24, and these three end faces form core faces 32, 34, and 36, respectively.

Face formation portions 28 and 30 of blocks 20 and 22 have distal end faces inclined through a predetermined angle with respect to core faces 32 and 34, respectively. These distal end faces respectively form pole faces. The lower end portion of block 24 is cut so as to correspond to the pole faces of the face formation portions respectively of blocks 20 and 22. The cut surfaces form the other pole faces. The pole face of block 20 and the corresponding pole face of block 24 are arranged parallel to and spaced apart from each other by a predetermined distance to define first read/write gap 38 therebetween. The pole face of block 22 and the corresponding pole face of block 24 are arranged in the same manner to form second read/write gap 40 therebetween.

First read/write coil 16 is wound around a middle portion of block 20, i.e., a portion between the portion connected to block 26 and face formation portion 28. Similarly, second read/write coil 18 is wound around a middle portion of block 22. First or second coil 16 or 18 is selected in accordance with a recording density of a floppy disk, which is loaded to a floppy disk apparatus, by a gap selecting circuit is energized in response to a read/write signal. When first coil 16 is energized, a magnetic flux path is formed through blocks 20, 26, and 24, and magnetic medium of the disk located immediately adjacent to gap 38. Similarly, when second coil 18 is energized, a magnetic flux path is formed through blocks 22, 26, and 24 and magnetic medium of the disk located immediately adjacent to gap 40.

Erase head 12 is arranged such that erase head 12 straddles read/write head 10. Erase head 12 has erase core 42 and erase coil 44 wound around core 42. Core 42 has a pair of core portions 46 and 48 arranged parallel to and spaced apart from each other by a predetermined distance and core portion 50 extending in a direction perpendicular to core portions 46 and 48 and coupling core portions 46 and 48, and is substantially U-shaped as a whole. Core portions 46, 48, and 50 have substantially square pillar shapes and are made of magnetic material such as ferrite. Both end portions of core portion 50 are connected to upper end portions of core portions 46 and 48, respectively. Erase core 42 is arranged to cover block 24 of read/write core 14 in a direction perpendicular to core 14. That is, block 24 of core 14 is arranged between a pair of core portions 46 and 48 and spaced apart therefrom by equal distances. Lower end portions of core portions 46 and 48 are bent toward block 24 of core 14 and slightly tapered. Lower end faces of core portions 46 and 48 form core faces 52 and 54 which are arranged in the same plane as that of core faces 32, 34, and 36 of core 14 described above. Pole faces are formed at the lower end portions of core portions 46 and 48 in a manner of opposing block 24 of core 14, respectively. Surfaces of block 24 opposing the respective pole faces of core portions 46 and 48 form the other pole faces, and a pair of erase gaps 56 and 58 are defined between these pole faces, respectively.

FIG. 3 is a bottom view of the above magnetic head device, in which arrow 60 indicates a rotational direction of a floppy disk. A main axis of the magnetic head device extends in a tangential direction of the rotation of the floppy disk. As is apparent from FIG. 3, core faces 32, 34, and 36 of blocks 20, 22, and 24 of core 14 are arranged in series with respect to the main axis. Gap 38 is located between core faces 32 and 36, and gap 40 is located between core faces 36 and 34, respectively. Gaps 38 and 40 extend parallel to each other in a direction perpendicular to the tangential direction of the rotation of the disk. Gaps 38 and 40 have predetermined gap lengths, i.e., different gap distances. For example, when a 3.5" floppy disk is to be used, the gap length of gap 38 is set at 0.7 to 0.9 μm which is an optimal value for a disk with a high recording density to date. The gap length of gap 40 is set at 1.5 to 2.0 μm which is an optimal value for a disk with a low recording density. In a conventional magnetic head device including only one read/write gap, a gap length for a 3.5" floppy disk is set at about 0.8 to 1.0 μm.

A pair of erase gaps 56 and 58 are provided at both sides of core face 36 of core 14 and have equal gap lengths. Gaps 56 and 58 are located midway between gaps 38 and 40 in the tangential direction to the rotation of the floppy disk.

An operation of the magnetic head device having the above arrangement will be described below.

When a disk with a high recording density is loaded with a floppy disk apparatus, first read/write gap 38 is selected by the gap selecting circuit. A detector checks the type of a floppy disk, i.e., checks whether the disk has a high or low recording density by detecting an object to be detected which is provided on the disk. The gap selecting circuit selects a suitable read/write gap in accordance with a signal from the detector. A read/write coil corresponding to the selected read/write gap is energized in response to a read/write signal, thereby executing a read/write operation. In this case, the gap length of selected read/write gap 38 is set optimal for a disk with a high recording density. Therefore, date can be read and written by the magnetic head device with optimal operation characteristics, i.e., resolution and electromagnetic conversion characteristics for the disk. As is apparent from FIG. 3, gap 38 is located behind erase gaps 56 and 58 in the rotational direction of the disk. Therefore, a phase of an area to be erased by gaps 56 and 58 advances with respect to an area (track) to be read/written by gap 38.

When a disk with a low recording density is loaded into the floppy disk unit, second read/write gap 40 is selected by the gap selecting circuit, thereby executing the read/write operation. Since gap 40 has a gap length optimal for the low recording density, the read/write operation optimal for a disk with the low recording density can be executed. In this case, gap 40 is located before gaps 56 and 58 in the rotational direction of the disk. Therefore, a phase of an area to be erased delays with respect to that of an area (track) to be read/written.

As a countermeasure against this phase difference, conventional phase controllers may be provided in correspondence to the respective read/write gaps, thereby adjusting drive timings of the read/write heads and the erase heads.

The type of a floppy disk may be designated from the host system to the selecting circuit. In this case, the gap selecting circuit selects a read/write gap in accordance with a designation signal from the host system.

According to the magnetic head device of the present invention having the above arrangement, optimal read/write characteristics can be assured for each of various floppy disks with different recording densities.

Figure 4:
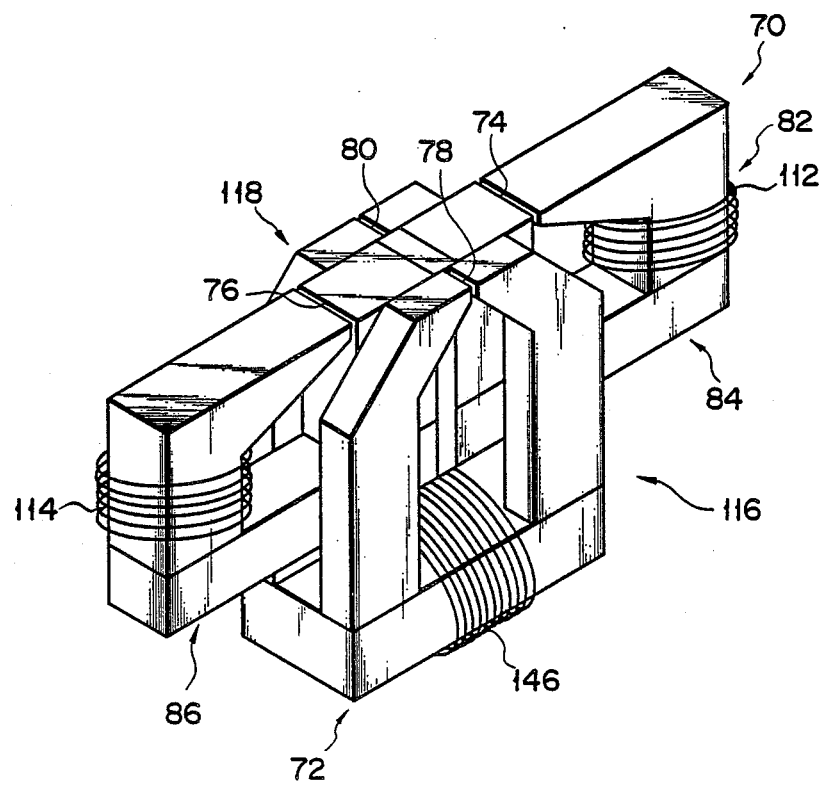
Figure 5:
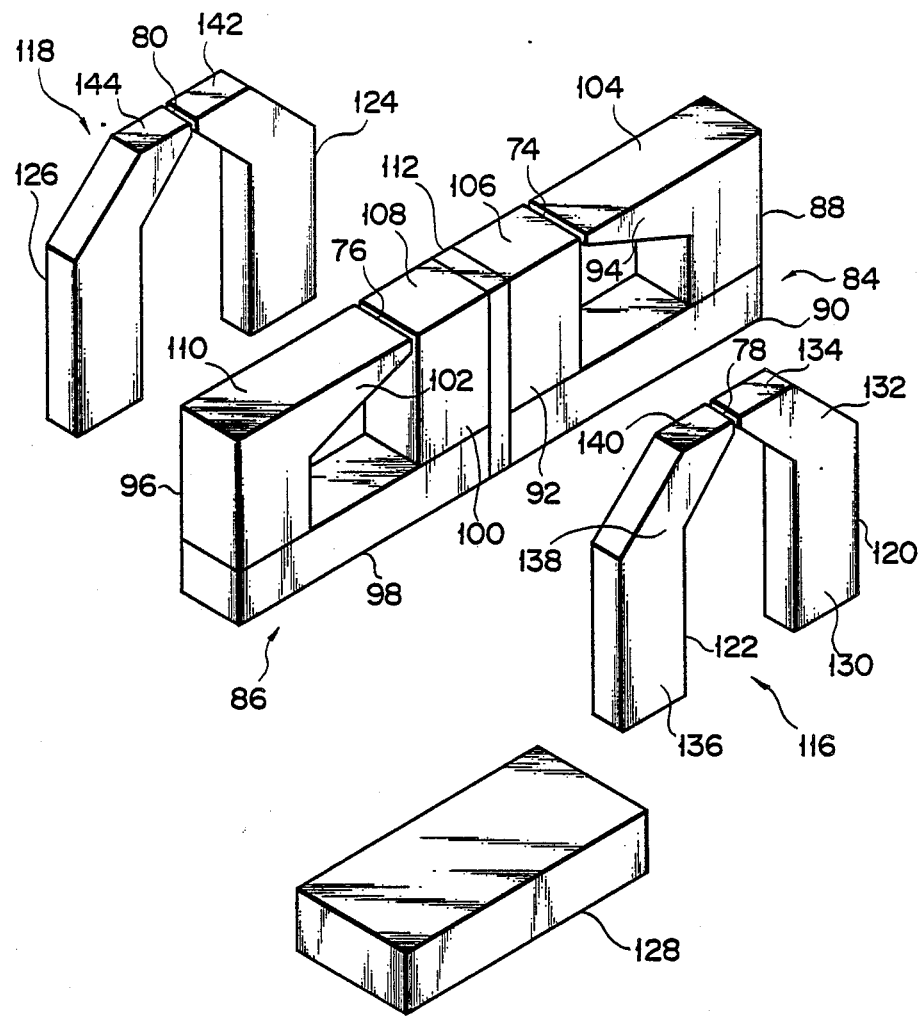

FIGS. 4 and 5 show a second embodiment of the magnetic head device according to the present invention. In the second embodiment, the magnetic head device is of a tunnel erase head type and, more particularly, a laminate type. In FIGS. 4 and 5, core faces which are brought into contact with a floppy disk face up for the sake of better understanding. As is apparent from FIG. 4, the magnetic head device includes read/write head 70 and erase head 72, and a pair of erase gaps 78 and 80 are arranged in the same direction of read/- write gaps 74 and 76, i.e., arranged parallel thereto. Read/write head 70 includes first core 84 having first read/write gap 74 and second core 86 having second read/write gap 76. Cores 84 and 86 have the same shape except for gap lengths and are arranged symmetrically in series. For this reason, an arrangement of only first core 84 will be described below, and a description of second core 86 will be omitted.

As is apparent from FIG. 5, core 84 includes three core blocks 88, 90, and 92 and is substantially C-shaped as a whole. Each of blocks 88, 90, and 92 have a substantially square pillar shape, and blocks 88 and 92 are arranged parallel to and spaced apart from each other by a predetermined distance. Block 90 extends in a direction perpendicular to blocks 88 and 92 and couples the blocks. Face formation portion 94 projects from an upper (i.e., upper in FIG. 5) end portion of block 88. Face formation portion 94 extends from the upper end portion of block 88 to an upper end portion of block 92 and is tapered. The distal end face of face formation portion 94 opposes parallel to a surface of block 92 and spaced apart therefrom by a predetermined distance, and these surfaces form pole faces, respectively. First read/write gap 74 is defined between these pole faces. The upper end faces of blocks 88 and 92 are located in the same plane and form core faces 104 and 106, respectively.

As described above, a gap length of gap 74 of first core 84 can be set at 0.7 to 0.9 μm, and that of gap 76 of second core 86 can be set at 1.5 to 2.0 μm.

First and second cores 84 and 86 are arranged such that block 92 of core 84 and corresponding block 100 of core 86 are located adjacent to each other. Gaps 74 and 76 are arranged parallel to each other, and core faces 104, 106, 108, and 110 are arranged in the same plane. Spacer 112 formed of a nonmagnetic material known in the art is inserted between adjacent cores 84 and 86.

As is apparent from FIG. 4, read/write head 70 includes read/write coils 112 and 114. First read/write coil 112 is wound around a lower end portion of block 88 of core 84, and second read/write coil 114 is wound around a lower end portion of block 96 of core 86.

An erase core of erase head 72 includes a pair of erase core sections 116 and 118 arranged adjacent to both sides of and parallel to read/write core 82. Erase core section 116 is formed of a pair of core blocks 120 and 122 and base block 128. Erase core section 118 is formed of core blocks 124 and 126 and base block 128. Base block 128 is a common block for both sections 116 and 118 and couples blocks 120, 122, 124, and 126. Blocks 120, 122, 124, and 126 which constitute erase core sections 116 and 118 have the same shape. For this reason, the shape of only block 120 will be described below. Block 120 has rectangular straight portion 130 and face formation portion 132 extending from an upper end portion of straight portion 130 in a direction inclined with respect thereto. An upper end face of face formation portion 132 is arranged parallel to a lower end face of straight portion 130. A distal end face perpendicular to the upper end face is formed at the distal end portion of face formation portion 132.

Blocks 120 and 122 are connected at their lower end faces of straight portions 130 and 136 to base block 128, thereby constituting base core portion 116. Straight portions 130 and 136 are parallel to each other, and the distal end faces of face formation portions 132 and 138 oppose each other. The distal end faces of face formation portions 132 and 138 form pole faces, respectively, and erase gap 78 is defined therebetween. Upper end faces of blocks 120 and 122 are arranged in the same plane and form core faces 134 and 140, respectively. Similarly, base core section 118 is constituted by core blocks 124 and 126 and base block 128.

A pair of core sections 116 and 118 having the above arrangement are disposed at both sides of and adjacent to the read/write core as follows. That is, core faces 134 and 140 of core section 116 and core faces 142 and 144 of core section 118 are arranged in the same plane as that of core faces 104, 106, 108, and 110 of the read/write core, and erase gaps 78 and 80 are aligned with each other and arranged between blocks 92 and 100 in the longitudinal direction of read/write core 82, i.e., arranged at the middle of spacer 112. Erase coil 146 is wound around base block 128 at a portion between blocks 120 and 122 of core section 116 and a portion between blocks 124 and 126 of core section 118. Erase coil 146 is used in common for the pair of erase core sections 116 and 118.

According to the magnetic head device having the above arrangement, the same operation as that of the magnetic head device of the first embodiment can be achieved and therefore the same effect as that obtained by the magnetic head device of the first embodiment can be similarly obtained.

Figure 6:
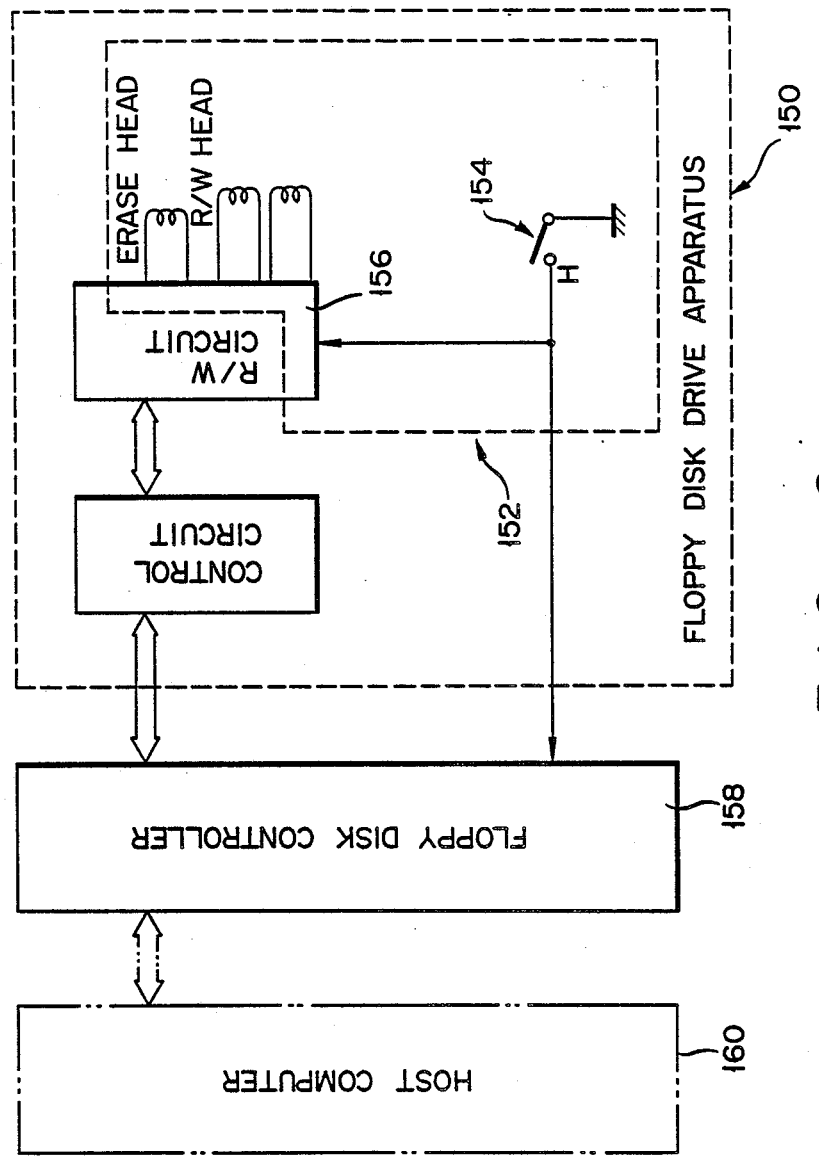
FIG. 6 is a block diagram showing a construction of a floppy disk drive apparatus into which the magnetic head device according to the invention is incorporated.

Now, an example of a floppy disk drive apparatus into which the magnetic head device of the invention is incorporated will be described with reference to FIG. 6.

At present, 3.5-inch floppy disks, for example, are classified into two types according to the capacity, i.e., high recording density floppy disks with a capacity of 1.6 Mbytes or more, and low recording density floppy disks with a lower capacity. The high recording density (HD) floppy disk has a through hole (or HD detection hole), which is formed in its hard jacket and from which the recording density is discriminated. The low recording density floppy disks have no such through holes.

Figure 7:
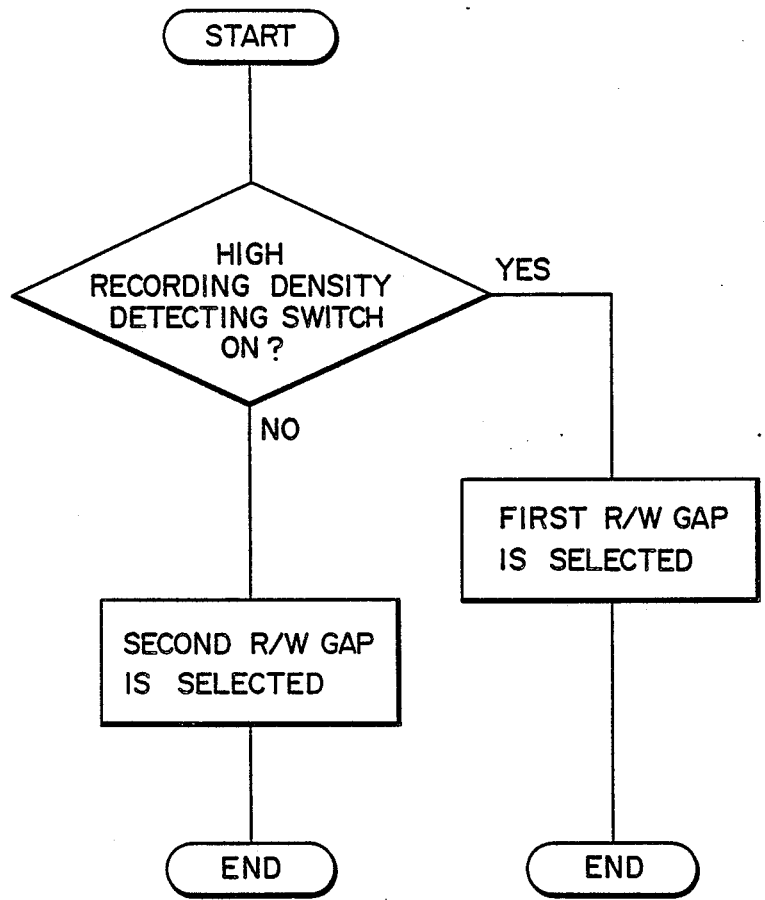
FIG. 7 is a flowchart showing the operation of a gap selecting circuit provided in the magnetic head device of the invention.

Magnetic head device 152 incorporated into the floppy disk drive apparatus includes the magnetic head device described above, detection switch 154 serving as means for detecting the recording density of a floppy disk as loaded, and a gap selecting circuit for selecting a suitable read/write (R/W) gap in accordance with the signal supplied from detection switch 154. The gap selecting circuit is incorporated into read/write (R/W) circuit 156 shown in FIG. 6. The operation of the gap selecting circuit is shown in the flowchart of FIG. 7.

Detection switch 154, which detects the recording density of the loaded floppy disk, comprises a photocoupler including a light emitting element (e.g., LED) and a light receiving element (e.g., phototransistor). The photocoupler is mounted to the floppy disk drive apparatus, such that the light emitted thereby passes through the HD detection hole formed in a jacket.

If the floppy disk as loaded into the apparatus has an HD detection hole, the light receiving element receives the light emitted from the light emitting element. In response to the reception of the light, the detection switch outputs signal H indicative of the recording density of the loaded floppy disk to floppy disk controller 158 and the gap selecting circuit of R/W circuit 156. As shown in FIG. 7, the gap selecting circuit selects the first R/W gap when it receives signal H, and selects the second R/W gap when it receives no signal. Data read/written from/into the floppy disk is carried out with the gap thus selected.

There are other methods for selecting a suitable gap in accordance with the recording density of a floppy disk loaded into the apparatus. For example, data representing a suitable gap may be input by the user to the gap selecting circuit via host computer 160. Alternatively, data recorded in the loaded floppy disk may be tentatively read in the high density mode, so as to determine whether the data is recorded in a high or low density.

The present invention is not limited to the above embodiments; it can be modified in various manners without departing from the spirit and scope of the invention. For instance, although in the foregoing embodiments, the R/W head has two R/W gaps, it may have three gaps or more.

What is claimed is:

1. A magnetic head device for a floppy disk drive apparatus, which can read data from, and write data on floppy disks of different recording densities and has a main axis extending in a tangential direction of rotation of said disk, said magnetic head device comprising:

a read/write head arranged along the main axis and having a first read/write gap for high recording density and a second read/write gap for low recording density, which extend in a direction substantially perpendicular to the main axis and are arranged at intervals substantially in the direction of the main axis, said first read/write gap having a first gap length, as measured in a direction parallel to the main axis, and a first gap width, as measured in the direction perpendicular to the main axis, and said second read/write gap having a second gap length, as measured in the direction parallel to the main axis, which is different from said first gap length, and a second gap width, as measured in the direction perpendicular to the main axis, which is the same as said first gap width;

an erase head having an erase gap;

detecting means for detecting the recording density of the floppy disk as loaded; and means for selecting one of the first and second read/write gaps in accordance with the recording density detected by the detecting means.

2. The device according to claim 1, wherein said erase gap extends substantially parallel to the main axis, respectively.

3. The device according to claim 1, wherein said erase gap extends substantially parallel to said read/write gaps.

4. The device according to claim 1, wherein said erase gap is positioned between said read/write gaps with respect to the main axis.

5. The device according to claim 1, wherein said first gap length is shorter than that of said second gap length.

6. The device according to claim 1, wherein said first read/write gap is located upstream of the second read/write gap with respect to rotation of the floppy disk.

* * * * *